United States Patent [19]

Futterknecht et al.

[11] Patent Number: 5,266,095
[45] Date of Patent: Nov. 30, 1993

[54] MECHANISM FOR USE IN A GLASSWARE FORMING MACHINE

[75] Inventors: Fritz Futterknecht, Zurich; Robert Huber, Wettingen, both of Switzerland

[73] Assignee: Emhart Glass Machinery Investments Inc., Wilmington, Del.

[21] Appl. No.: 970,295

[22] Filed: Nov. 2, 1992

[30] Foreign Application Priority Data

Nov. 16, 1991 [GB] United Kingdom ............... 9124395

[51] Int. Cl.5 ............................ C03B 9/40; F01B 3/00
[52] U.S. Cl. ........................................ 65/234; 65/260; 65/261; 65/307; 65/323; 65/300; 92/31
[58] Field of Search .................. 65/161, 214, 215, 216, 65/219, 260, 300, 261, 307, 323, 181, 234; 92/31, 116

[56] References Cited

U.S. PATENT DOCUMENTS

| | | | |
|---|---|---|---|
| 3,457,838 | 7/1969 | Rowe | 92/33 |
| 3,630,709 | 12/1971 | Irwin | 65/261 |
| 3,986,858 | 10/1976 | Irwin et al. | 65/234 |
| 4,098,597 | 7/1978 | Nebelung | 65/181 |
| 4,120,683 | 10/1987 | Irwin | 65/323 |
| 4,657,474 | 4/1987 | Nebelung | 65/300 |

Primary Examiner—Karen M. Hastings
Assistant Examiner—Steven P. Griffin
Attorney, Agent, or Firm—Spencer T. Smith

[57] ABSTRACT

Mechanism for moving an operative member such as a blowhead funnel or baffle in a glassware forming machine comprises a piston rod on which the operative member may be mounted and two piston heads on the rod which may be operated independently of each other, one to cause axial movement of the rod and the other to cause rotation of the rod.

3 Claims, 2 Drawing Sheets

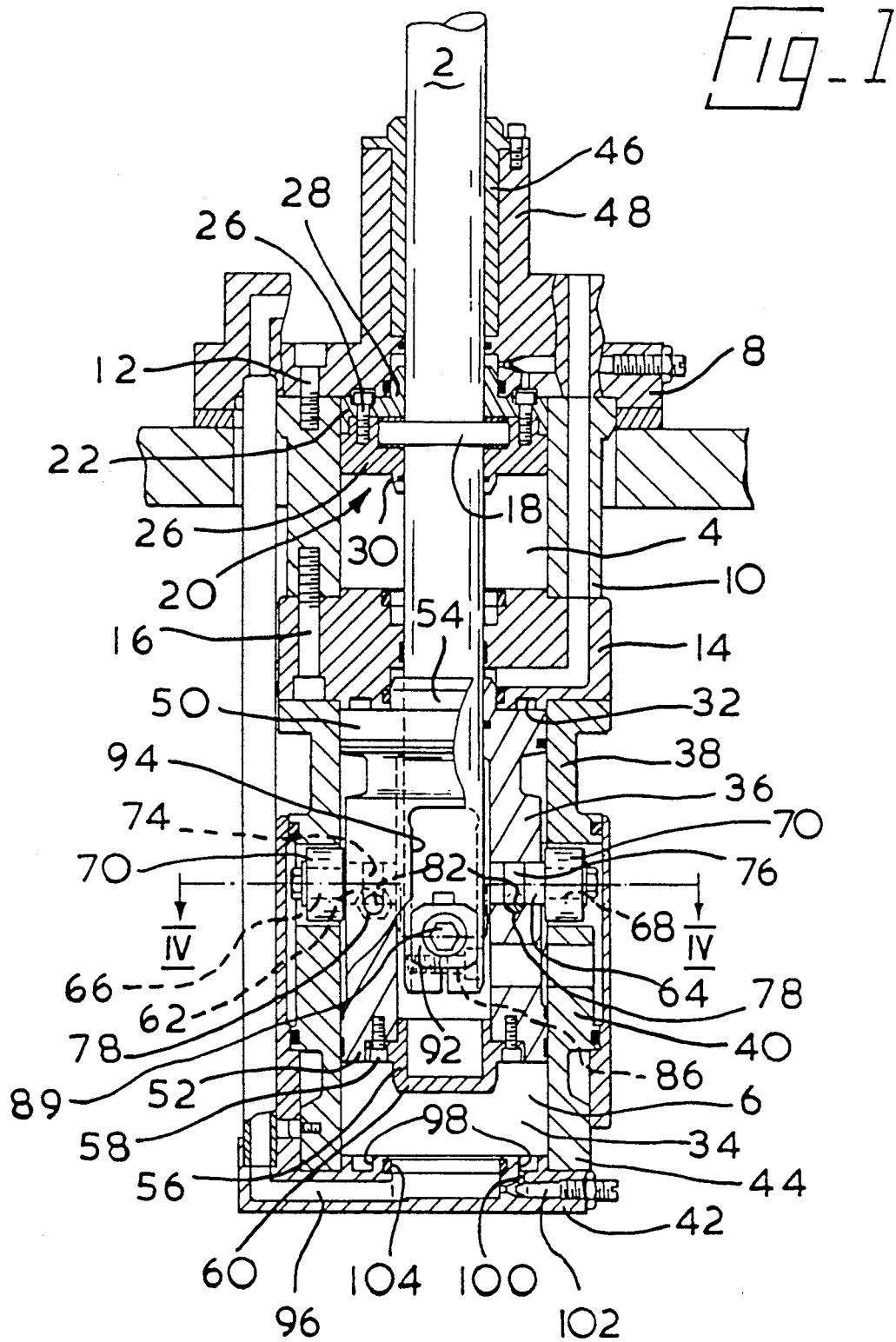

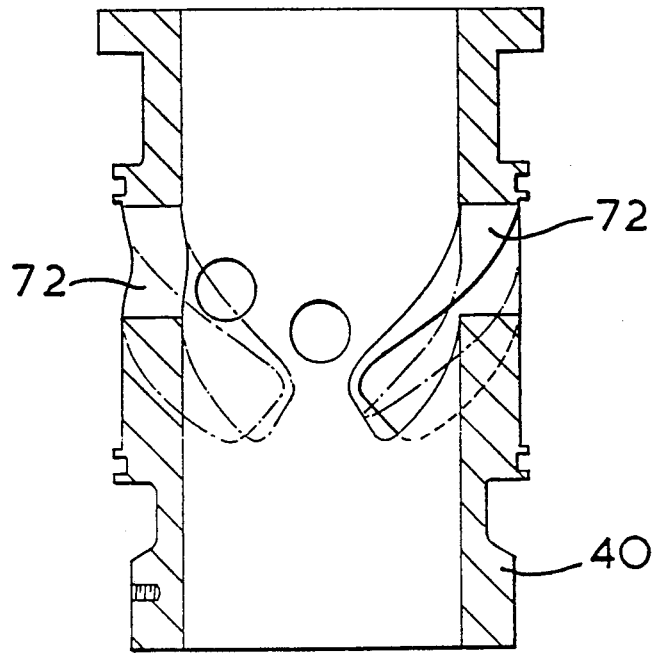
Fig_2
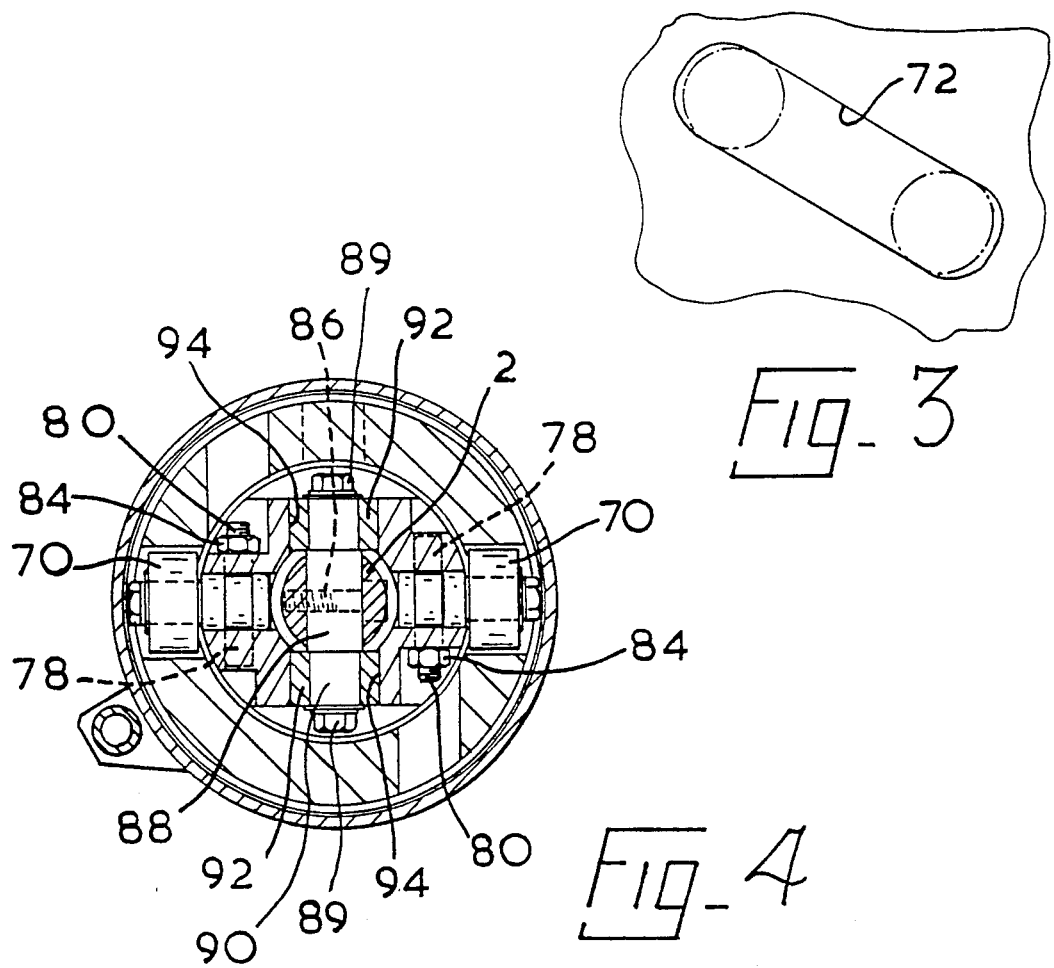
Fig_3
Fig_4

MECHANISM FOR USE IN A GLASSWARE FORMING MACHINE

This invention is concerned with a mechanism for use in a glassware forming machine for moving an operative member such as a blowhead, funnel or a baffle.

BACKGROUND TO THE INVENTION

In a glassware forming machine of the so-called 'individual section' type, the need arises to move certain operative members between out of the way positions and operative positions in which the operative member is aligned with an opening of a mould cavity of the machine. For example the machine comprises a blank mould in which parisons are formed and it is necessary to move a funnel into alignment with the mould opening so that it can guide a gob of molten glass into the mould cavity and then into an out of the way position to allow a baffle to be positioned on the mould. The same situation arises with regard to the baffle in relation to the blank mould and with regard to a blowhead in relation to a blow mould in which the parisons formed in the blank mould are blown into containers by air supplied through the blowhead.

Conventional mechanism for moving such an operative member in an individual section type machine comprises a piston and cylinder assembly having a vertically extending piston rod which projects in both directions from a piston. One end portion of the piston rod carries a horizontally extending arm on which the operative member is mounted. The other end of the piston rod carries a cam which is engaged in a spiral cam track. The arrangement is such that, when the piston and cylinder assembly is operated, the piston rod moves vertically causing the operative member to move vertically. As this movement takes place the cam track causes the piston rod to turn about its longitudinal axis thereby swinging the arm and the operative member about this axis. The operative member is thus moved in a movement which has a rotary component about the longitudinal axis of the rod and a linear component in a vertical direction.

Mechanisms of the above type are shown for example in U.S. Pat. Nos. 3,630,709, 3,986,858 and 4,120,683.

Mechanisms of the above type suffer from certain short comings. The swinging movement for the operative member is determined by the precise shape of the cam track. Consequently it is not readily capable of adjustment, and it is difficult, particularly because the swinging movement is achieved within a fairly short stroke of the piston, adequately to cushion the swinging movement of the operative member. The moving means is also prone to develop vibrations if the shape of the cam track and the speed of movement of the piston are not accurately correlated.

BRIEF SUMMARY OF THE INVENTION

It is one of the objects of the present invention to provide an improved mechanism for use in a glassware forming machine for moving an operative member such as a blow head, funnel or baffle.

The present invention provides mechanism for use in a glassware forming machine for moving an operative member between an out-of-the-way position and an operative position in alignment with an opening of a mould cavity, the operative member making a movement which has a rotary component about a vertical axis and a linear component in a vertical direction, the mechanism being adapted to support a horizontally extending arm on which the operative member is mounted, and the mechanism comprising a piston rod which extends vertically, to which the arm may be attached, and which is caused to perform vertical linear movement and rotary movement about its vertical axis a first cylinder, a first piston head secured to the piston rod against axial movement relative to the rod and mounted in said first cylinder, a second cylinder, a second piston head mounted on the piston rod for limited axial movement but secured against radial movement relative to the rod, and mounted in said second cylinder cam means acting between the second piston head and the second cylinder so that axial movement of the second piston head causes rotation of the second head and thus of the piston rod and means for supplying compressed air to the first cylinder and to the second cylinder independently of each other.

There now follows a description, to be read with reference to the accompanying drawings, of a mechanism which illustrates the invention by way of example.

In the accompanying drawings

FIG. 1 shows a view in section of the illustrative mechanism;

FIG. 2 shows a sectional view of a cylinder member of FIG. 1;

FIG. 3 shows, diagrammatically developed, a cam slot of the cylinder member of FIG. 2;

FIG. 4 shows a section along the line IV—IV of FIG. 1.

DETAILED DESCRIPTION

The illustrative mechanism is for use in a glassware forming machine for moving an operative member, which may be a funnel, a baffle or a blow head, between an out-of-the-way position and an operative position in which the operative member is in alignment with an opening of a mould cavity. The operative member makes a movement which has a rotary component about a vertical axis, to swing the member between an out-of-the-way position and a position above the mould cavity opening, and a linear component in a vertical direction, to bring the operative member into its required position close to the mould cavity. The mechanism is adapted to support a horizontally extending arm (not shown in the drawings) on which the operative member is mounted.

The illustrative mechanism comprises a shaft in the form of a vertically extending piston rod 2 which is mounted for movement in two cylinders, a first, upper, cylinder 4 and a second, lower, cylinder 6. A horizontally extending arm (not shown) can be attached towards an upper end of the piston rod 2 and support an operative member. The upper cylinder 4 comprises a head block 8, a cylindrical wall portion 10 to which the block 8 is secured by screws 12 and an intermediate block 14 secured to the wall portion 10 by screws 16. The piston rod 2 is provided with a flange 18 on which is rotatably secured a first piston head 20 comprising an upper portion 22 and a lower portion 24 secured together by screws 26. The upper portion 22 comprises a central boss 28 extending upwardly of the head 20, and the lower portion 24 a central boss 30 extending downwardly of the head 20. O ring seals are provided which prevent the passage of air between the piston rod 2 and the head 20. The first piston head 20 is thus secured to the rod 2 against axial movement relative to the shaft, but is capable of rotation relative to the shaft.

The lower cylinder 6 comprises an upper chamber 32 and a lower chamber 34. A second piston head 36 is slidably mounted for limited axial movement on the piston rod 2. The upper chamber 32 is provided between the second piston head 36, the intermediate block 14, and a bore of an upper wall portion 38 of a cylinder member 40. The lower chamber 34 is provided between an end cap 42, a bore of a lower wall portion 44 of the cylinder member 40 and the piston head 36.

The cylinder member 40 is secured to the end cap 42 and the intermediate block 14 by screws (not shown).

The piston rod 2 is supported in a sleeve 46 mounted in an upward extension 48 of head block 8.

The second piston head 36 comprises an upper head 50 which fits closely into the bore of the upper wall portion 38, and a lower head 52 which fits closely into the bore of the lower wall portion 44. A central boss 54 extends upwardly around the piston rod 2 from the upper head 50. A cap member 56 secured to the lower head 52 by screws 58 comprises a downwardly extending central boss 60.

Two pins, 62, 64 having eccentric extensions 66,68 are secured diametrically opposite each other in a central portion of the piston head 36, and support rollers 70,70 which rest in cam slots 72,72 formed in the cylinder member 40 [see FIG. 2]. It can thus be seen that cam means is provided acting between the piston head 36 and the cylinder member 40 so that when the piston head moves axially with respect to the cylinder member 40, the rollers 70 moving in the slots 72 will cause rotation of the piston head 36, and thus as will be later made clear, rotation of the piston rod 2.

The pins 62, 64 are provided with shallow circumferential grooves 74, 76. Two tapered securing pins 78 each having a threaded outer end portion 80 and a cylindrical inner end portion are mounted in bores in the piston head 36, flat surfaces 82 of the pins lying in the grooves 74, 76. On loosening nuts 84 on the outer end portion 80 of the pins 78, the pins 62, 64 are freed for rotation to allow for precise positioning of the rollers 70 about the eccentric extensions 66, 68. Tightening the nuts 84 draws the tapered pins 78 to lock the pins 62,64 in their desired adjusted positions.

The piston rod 2 is secured in the piston head 36 so that while it rotates with the head 36 it is capable of limited axial movement relative to the head 36. Secured transversely in the piston rod 2 by a screw 86 [see FIG. 4] is a cross shaft 88, and secured on reduced end portions 90 of the shaft 88 by bolts 89 are two slide blocks 92, 92 which are arranged to lie in slots 94, 94 provided in the piston head 36. The blocks 92, 92 can slide in the slots 94, 94 thus allowing for the relative axial movement between the piston rod 2 and the piston head 36.

It will be understood that each of the piston heads 20 and 36 are caused, in the operation of the mechanism, to move in the upper and lower cylinders 4 and 6 respectively. Pneumatic cushioning means is provided which damps the movement of the piston heads at the ends of their strokes. The pneumatic damping means at the end of the downward stroke of the piston head 36 will now be described.

Compressed air is supplied to the lower chamber 34 (to cause upward movement of the piston head 36) through a passage 96 provided in the end cap 42. The end cap 42 also comprises a circular groove 98 which communicates with a vent hole 100 which communicates with the passage 96 past an adjustable restrictor 102. The passage 96 opens into a circular recess 104 found in the end cap 42.

Downward movement of the piston head 36 is caused by admission of air into the upper chamber 32 (through passages not shown) and venting of air from the lower chamber 34. The venting of the air is sufficiently rapid for it to offer effectively no resistance to downward movement of the piston head 36 until the boss 60 of the cap member 56 enters into the recess 104. A small amount of air is then trapped between the piston head 36 and the end cap 42 which can only escape via the groove 98 and the vent hole 100, past the restrictor 102 into the passage 96. The end part of the downward movement of the piston head 36 is thus cushioned to an extent which may be adjusted by adjustment of the restrictor 102.

A similar cushioning arrangement (not shown in detail) operates to cushion the ends of the upward movement of the head 36 and both the upward and downward movement of the piston head 20, the bosses 28,30 and 54 being arranged to operate in a manner strictly comparable to the boss 60.

The supply of compressed air to, and the venting of air from, the chambers 32 and 34 and the two portions of the chambers provided on either side of the piston head 20 by the cylinder 4 are controlled by pneumatic valves which may be operated by a conventional control system. It can be seen that the axial movement of the piston rod 2 and its rotational movement may be independently operated, so that the rod 2 can be arranged to perform an axial movement, followed by a rotational movement, or if preferred to perform a rotational movement during part of the axial movement of the rod.

This may be particularly advantageous in the operation of a baffle in a blow and blow sequence in a glassware forming machine, because instead of the conventional cycle of movement, necessitated by mechanisms in which the rotational movement of the piston rod is brought about by axial movement thereof, a shorter cycle of movement can be obtained.

The conventional cycle comprises the following steps:
1. Funnel in and down
2. Baffle in and down
3. Settle Blow
4. Baffle up and out
5. Funnel up and out
6. Baffle in and down
7. Counter Blow
8. Baffle up and out.

The modified cycle, which can be obtained with the mechanism just described comprises the following steps
1. Funnel in and down
2. Baffle in and down
3. Settle blow
4. Baffle up (but no outward movement)
5. Funnel up and out
6. Baffle down (but no inward movement)
7. Counter blow
8. Baffle up and out.

A reduction of cycle time, without speeding up the movement of the baffle, can thus be obtained.

In the illustrative mechanism, the cam slots 72 are straight, and the precise relationship between the axial movement of the rod 2 and its rotational movement can be obtained by control of the supply of compressed air to the upper and lower cylinders. Straight slots are convenient to manufacture. However, if it is desired to obtain a particular rotational movement of the piston rod 2, the slots 72 may be curved to the extent required.

It will be understood that adjustment of the precise position of the rollers 70 in the slots 72 by rotation of the pins 62 and 64 allows for any wear in the slots 72 or of the rollers 70 to be allowed for.

It will also be understood that, by appropriate actuation of valves controlling the supply of air to the upper and lower cylinders, not only may axial and rotary movement of the piston rod be performed, as desired, sequentially or overlapping in time, but the precise relationship can be modified even while the machine is operating by modifying the timing of such valve operation.

What is claimed is:

1. A mechanism for displacing an operative member in a glassware forming machine, along a vertical axis and conjointly rotationally about the vertical axis, between an out of the way position and an operative position comprising
    a piston rod,
    a sleeve for supporting said piston rod for vertical displacement,
    a first piston head having a central bore for receiving said piston rod,
    means for securing said first piston head to said received piston rod at a selected axial location,
    a first cylinder for receiving said first piston head,
    a second piston head having a bore for receiving said piston rod,
    means for interconnecting said second piston head and said piston rod for selected relative axial displacement,
    a second cylinder for receiving said second piston head,
    cam means acting between said second piston head and said second cylinder for rotating said piston head and interconnected piston rod as said second piston head is displaced axially relative to said second cylinder, and
    means for axially displacing said first and/or second piston heads.

2. A mechanism according to claim 1 wherein said means for securing said first piston head to said piston rod includes means for permitting relative rotational displacement therebetween.

3. A mechanism according to claim 1, wherein said interconnecting means comprises axial slots defined in said second piston head bore and said piston rod includes axially extending slides received in said slots.

* * * * *